Patented July 6, 1926.

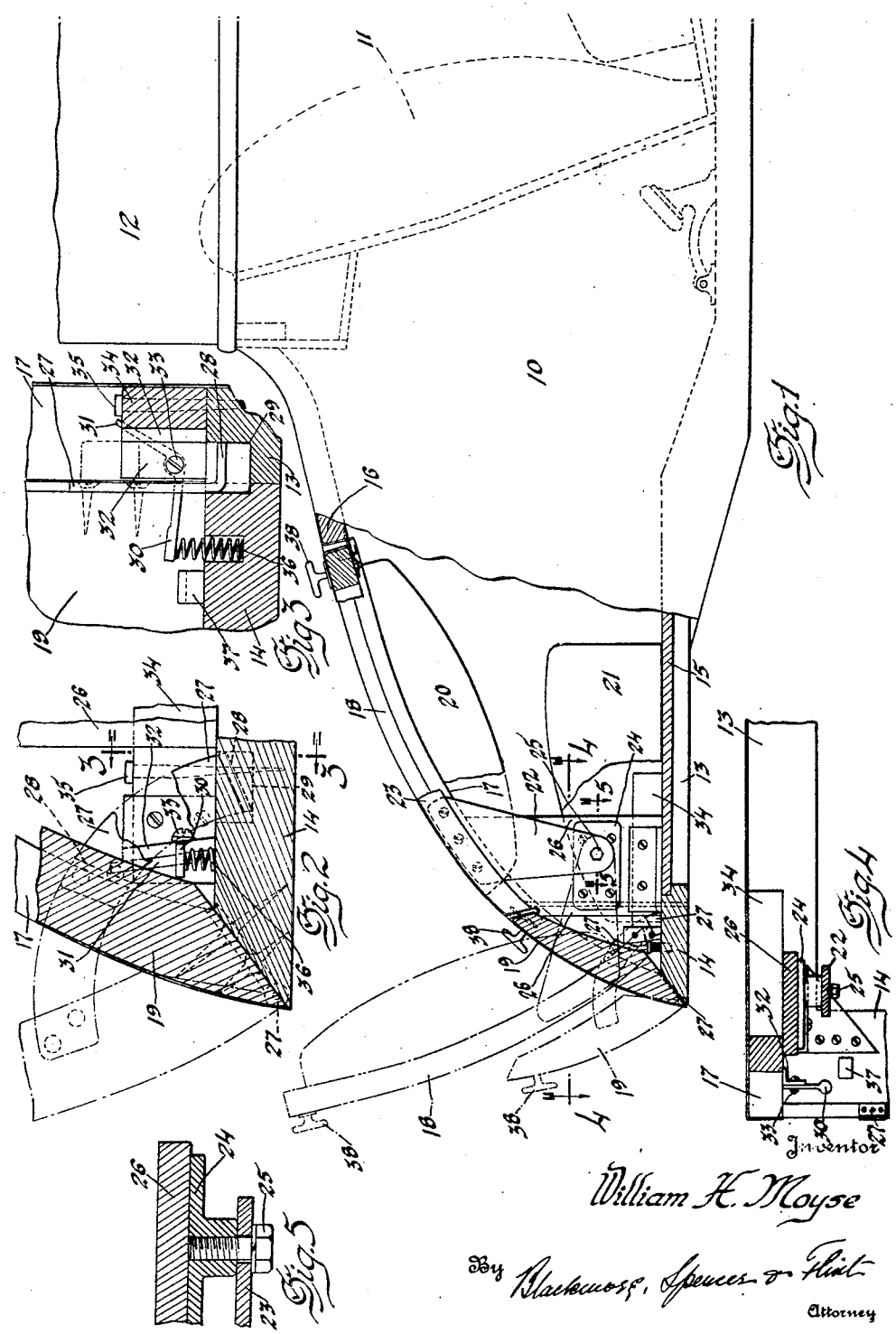

1,591,641

UNITED STATES PATENT OFFICE.

WILLIAM H. MOYSE, OF OSHAWA, ONTARIO, CANADA, ASSIGNOR TO GENERAL MOTORS CORPORATION, OF DETROIT, MICHIGAN, A CORPORATION OF DELAWARE.

DICKEY SEAT.

Application filed September 18, 1925. Serial No. 57,165.

My invention relates to the body and seat construction and arrangement of motor vehicles, and particularly to vehicles of the roadster type or class having a single main seat for the driver and one or two passengers and wherein and without departing from the characteristic lines and appearance of the roadster type of body, an auxiliary or dickey seat may, in case of emergency, be provided at the rear of the main seat for additional passengers.

In dickey seat constructions heretofore in use it has been impossible to provide sufficient leg room for the occupant of the dickey seat except in automobiles having comparatively long bodies; so that the provision of dickey seats in vehicles of short wheel base, and in which the bodies are comparatively short, has been regarded as impracticable, because of the difficulty and practical impossibility of providing sufficient room for the legs and feet of the occupant of the seat in such short body vehicles.

The object of my invention, therefore, is to provide a dickey seat arrangement applicable to automobiles of comparatively short wheel base and having bodies shorter than in the general run of roadster or sport bodies, and wherein abundant leg room will be provided for the occupant of the seat so that he can ride with comfort, and without being forced to assume a cramped position; such end being attained, generally speaking, by providing a body and seat arrangement wherein the back of the dickey seat is made to assume a position further back in the body than heretofore, and further to the rear thereof than has been possible in such structures as heretofore made.

With the above and other objects of invention in view, my invention consists in the improved auxiliary or dickey seat construction and arrangement illustrated in the accompanying drawing, described in the following specification, and particularly claimed at the end thereof; and in such variations and modifications thereof, within the scope of the concluding claims, as will be obvious to those skilled in the art to which my invention relates.

In the drawing accompanying and forming a part of this specification and wherein the preferred form of my invention is illustrated:

Figure 1 is a fragmentary view showing the rear end of a conventional sport or roadster automobile body equipped with my improved dickey seat, the view being partly in section upon a vertical longitudinally extending plane and partly in side elevation.

Figure 2 is a fragmentary view showing details of certain stop and locking mechanism forming a part of my invention, as seen from within the body and looking toward the farther or left side thereof;

Figure 3 is a view showing the parts shown in Figure 2 as seen from inside the body looking toward the rear thereof from the plane 3, 3, Figure 2.

Figure 4 is a view showing the same parts looking down from the plane 4, 4, Figure 1.

Figure 5 is a fragmentary view taken upon a horizontal plane indicated by the line 5, 5, Figure 1.

Referring now to the drawing, the reference numeral 10 designates in a conventional manner the rear portion of a motor vehicle body of the roadster model or type, 11 the back of the main or driver's seat located at the front thereof, and 12 the usual top or canopy over the driver's seat. The body ordinarily includes longitudinally extending sills supported from the chassis frame not shown, one of which is indicated at 13, a transversely extending cross sill 14 connecting the rear ends of the longitudinal sills, floor boards 15 supported by the longitudinal sills, suitable cross bars 16, as many as may be necessary, and top side rails 17; and the skeleton framework thus provided is covered by a metallic sheathing, all as is usual in automobile body construction.

The body 10 is provided with an opening in the upper side of the rear portion thereof behind the main seat; said opening extending from the cross bar 16 clear to the rear end of the body and being closed by two pivotally supported sections, the upper and forward one 18 of which is herein designated as a back section because it forms a seat back when it is in its upright or open position shown in dotted lines in Figure 1, and the second or lower and rear one of which, to which the numeral 19 is applied, serves to close the part of the opening in the body which is below and to the rear edge of the back section. These sections commonly comprise suitable frames having metal coverings which, when the sections are closed, are continuous with one another, and provide the usual roadster type or form of vehicle body; and the back section carries a back cushion 20 which in connection with the lower cushion 21 inside the body provides an auxiliary or dickey seat when the sections are in their open positions, as shown in full and in dotted lines in Figure 1 of the drawing.

The pivotal connection between the rear end of the upper and forward seat section 18 and the body is preferably provided by two arms secured one to each side of the section, and which extend downward therefrom and into the body, the farther one only of said arms upon the left side of the body being shown and designated by the numeral 22. The upper ends of these arms are rigidly fastened to the side bars 23 of the frame of the back section, and their lower ends are loosely fastened to pivot plates 24, one only of which is shown, by cap screws 25. The plates 24 may be supported in proper positions inside the vehicle body in any way as by being fastened to posts 26 extending between the sills 13 and the top rails 17 and, inasmuch as the axes of the screws 25 upon which the arms swing are located up and above the floor in the preferred form of pivotal connection illustrated the back section may be referred to as pivoted to, or relative to the sides of the body, in the more specific aspect of the scheme whereby the back section is pivotally connected with the body of the vehicle.

When the back section is open it extends upward from the extreme rear end of the vehicle body, thus providing a maximum of room for the legs of the occupant of the dickey seat; and when the sections are open to provide the seat the second or lower and rear section which closes the extreme rear end of the opening in the body lies to the rear of the seat section, as shown in dotted lines in Figure 1. This second or rear section is shown as pivotally connected with the cross sill 14 by hinges 27; and both sections extend from side to side of the body, and lie between the top rails 17 thereof, to thereby provide a smooth and continuous exterior body surface when the sections are closed, as will be appreciated.

Secured to the sides of the second section 19 so as to move therewith are two stop members 27, the one at the further side only being shown; and the front ends of these stops are bent outwardly, as shown at 28, so that when the section is opened these outwardly bent ends will engage with the inner faces of the body rails 17 to thereby limit the outward movement and rearmost position of the second section. A recess 29 is shown in the longitudinal and cross sill for receiving the end of the stop member and its outturned end when the section is closed; although whether such a recess is necessary will obviously be determined by the proportion and arrangement of the parts, and the extent of rearward movement required for the rear section.

In order to prevent movement of the rear section 17 when the seat is in use locking means is provided for holding the same in a fixed position at such times, so that roughness of the road or movement of the body cannot result in slamming of the rear section against the back of the seat section; such locking means being shown as comprising two swinging latch members, one only of which is shown, each such member having a horizontal arm 30 and an upwardly extending arm 31, and the same being pivotally fastened to right angular brackets 32 by pivot screws 33. The brackets 32 are arranged inside the body and may be supported in any suitable manner as by being fastened to blocks 34 which in turn are fastened to the side sills 13 as by lag screws 35. The horizontal arms 30 of the latch members are normally forced upward by springs 36, so that the upper ends of the arms 31 will be out of the paths of the bent ends 28 of the stop members 27, and so that the section 19 may be opened. After the section 19 has been opened, however, and as the back section 18 moves into its final position as it is opened, the rear and lower edge of the back section contacts with and presses down upon the horizontal arms 30 and swings the free ends of the arms 31 into positions in front of the bent out ends 28 of the stop members 27. The said free ends when in the position just explained obviously prevent forward or closing movement of the rear section 19 and, inasmuch as rearward movement of the section is prevented by engagement of the ends 28 with the top rails 17 as hereinbefore explained, the said back section is thus securely locked and held against movement when the back section is open and the seat is in use.

When the back section is open and the seat in use the lower edge thereof rests upon stops 37 carried by the rear cross sill 14; and suitable latches 38 are provided for holding the pivoted sections in their closed positions, as will be understood.

Having thus described and explained my invention I claim and desire to secure by Letters Patent:

1. In a dickey seat construction for motor vehicles and in combination with a vehicle body having an opening behind the main seat of the vehicle and extending to the rear end of the body thereof, a pivotally supported back section adapted when closed to close the upper and forward part of said opening, and when in an open position to form a seat back which extends upward from the rear end of the body; and a second section pivotally connected at its lower end with the body at the rear end thereof, and which second section when closed closes the lower and rear part of said opening and forms a continuation of said back section, and when open lies to the rear of said back section when it also is open.

2. In a dickey seat construction for motor vehicles and in combination with a vehicle body having an opening behind the main seat of the vehicle and extending to the rear end of the body thereof, a pivotally supported back section adapted when closed to close the upper and forward part of said opening, and when open to form a seat back which extends upward from the rear end of the body; a second section pivotally connected at its lower end with the body at the rear end thereof, and which second section when closed closes the lower and rear part of said opening and forms a continuation of said back section, and when open lies to the rear of said back section when it also is open; and means operated by said back section as it moves into its open position for locking said second section in its open position.

3. In a dickey seat construction for motor vehicles and in combination with a vehicle body having a transversely extending cross sill at its rear end, and an opening behind the main seat of the vehicle and extending to the rear end of the body thereof; a swinging back section pivotally connected at its sides to the body and adapted when closed to close the upper and forward part of said opening, and when in an open and upright position to form a seat back; and a second swinging section pivotally connected with said cross sill and adapted when closed to close the lower and rear part of said opening and form a continuation of said back section, and which second section lies to the rear of said seat section when both of said sections are open.

4. In a dickey seat construction for motor vehicles and in combination with a vehicle body having a transversely extending cross sill at its rear end, and an opening behind the main seat of the vehicle and extending to the rear end of the body thereof; a swinging back section pivotally connected at its sides to the sides of the body and adapted when closed to close the upper and forward part of said opening, and when in an open and upright position to form a seat back; a second swinging section pivotally connected with said cross sill and adapted when closed to close the lower and rear part of said opening and form a continuation of said back section, and which second section lies to the rear of said seat section when both of said sections are open; stop members carried by said second section and adapted to engage cooperating stops upon the body for limiting the opening movement of said section; and latch members engaged by said back section as it moves into its open position, and which latch members cooperate with said stop members to lock said second section in its open position.

5. In a dickey seat construction for motor vehicles and in combination with a vehicle body having a transversely extending cross sill at its rear end, and an opening behind the main seat of the vehicle and extending to the rear end of said body; a back section adapted when closed to close the upper and forward part of said opening, and when open to form an upwardly extending seat back; arms extending downward from each side of the rear part of said back section, and the lower ends of which are pivotally connected with the sides of the vehicle body within the same; and a second swinging section the lower end of which is pivotally connected with said cross sill; said second section serving to close the lower and rear part of said opening and to form a continuation of said back section when both sections are closed, and to lie to the rear of said back section when both sections are open.

6. In a dickey seat construction for motor vehicles and in combination with a vehicle body having a transversely extending cross sill at its rear end, and an opening behind the main seat of the vehicle and extending to the rear end of said body; a back section adapted when closed to close the upper and forward part of said opening, and when open to form an upwardly extending seat back; arms extending downward from each side of the rear part of said back section, and the lower ends of which are pivotally connected with the sides of the body within the same; a second swinging section the lower end of which is pivotally connected with said cross sill, said second section serving to close the lower and rear part of said opening and to form a continuation of said back section when both sections are closed, and to lie to the rear of said back section when both sections are open; swinging latch members arranged one upon each side of the body, and which members are engaged and operated by the lower edge of said back section as it moves into its open position; and stop members carried by said second section and with which said latch members cooperate to lock said second section in its open position.

In testimony whereof I affix my signature.

W. H. MOYSE.